(12) United States Patent
Kido et al.

(10) Patent No.: US 9,815,986 B2
(45) Date of Patent: Nov. 14, 2017

(54) METHODS FOR PRODUCING AQUEOUS PIGMENT DISPERSION LIQUID AND WATER-BASED INK FOR INK JET RECORDING

(71) Applicant: DIC CORPORATION, Tokyo (JP)

(72) Inventors: Masahiro Kido, Kita-adachi-gun (JP); Kumiko Iizasa, Kita-adachi-gun (JP); Shinichi Okada, Kita-adachi-gun (JP)

(73) Assignee: DIC CORPORATION, Tokyo (JP)

( * ) Notice: Subject to any disclaimer, the term of this patent is extended or adjusted under 35 U.S.C. 154(b) by 0 days.

(21) Appl. No.: 14/906,333

(22) PCT Filed: Sep. 18, 2014

(86) PCT No.: PCT/JP2014/074671
§ 371 (c)(1),
(2) Date: Jan. 20, 2016

(87) PCT Pub. No.: WO2015/046011
PCT Pub. Date: Apr. 2, 2015

(65) Prior Publication Data
US 2016/0160050 A1 Jun. 9, 2016

(30) Foreign Application Priority Data

Sep. 27, 2013 (JP) ................................. 2013-201484

(51) Int. Cl.

| | |
|---|---|
| *C09B 62/04* | (2006.01) |
| *C09B 67/04* | (2006.01) |
| *B41J 2/01* | (2006.01) |
| *C09D 11/00* | (2014.01) |
| *C09B 48/00* | (2006.01) |
| *C09D 17/00* | (2006.01) |
| *C09B 67/00* | (2006.01) |
| *C09B 67/22* | (2006.01) |
| *C09B 67/46* | (2006.01) |
| *C09D 11/106* | (2014.01) |
| *C09D 11/322* | (2014.01) |
| *C09D 11/38* | (2014.01) |

(52) U.S. Cl.
CPC ............ *C09B 67/0002* (2013.01); *B41J 2/01* (2013.01); *C09B 48/00* (2013.01); *C09B 67/009* (2013.01); *C09B 67/0022* (2013.01); *C09B 67/0036* (2013.01); *C09D 11/00* (2013.01); *C09D 11/106* (2013.01); *C09D 11/322* (2013.01); *C09D 11/38* (2013.01); *C09D 17/00* (2013.01)

(58) Field of Classification Search
CPC ............ C09B 67/0002; C09B 67/0022; C09B 67/0036; C09B 67/009; C09B 48/00; C09D 11/00; C09D 11/38; C09D 11/322; C09D 11/106; C09D 17/00; B41J 2/01
See application file for complete search history.

(56) References Cited

U.S. PATENT DOCUMENTS

| | | | |
|---|---|---|---|
| 6,241,811 B1 | 6/2001 | Sano | |
| 2006/0235106 A1* | 10/2006 | Okada | C09B 67/0036 523/160 |
| 2012/0220703 A1 | 8/2012 | Kido et al. | |
| 2012/0232199 A1 | 9/2012 | Idemura et al. | |

FOREIGN PATENT DOCUMENTS

| | | |
|---|---|---|
| JP | 2003-226832 A | 8/2003 |
| JP | 2004-352932 A | 12/2004 |
| JP | 2005-48006 A | 2/2005 |
| WO | 98/44059 A1 | 10/1998 |
| WO | 2011/024855 A1 | 3/2011 |
| WO | 2011/034043 A1 | 3/2011 |

OTHER PUBLICATIONS

International Search Report dated Dec. 9, 2014, issued in counterpart Application No. PCT/JP2014/074671 (2 pages).

* cited by examiner

*Primary Examiner* — Robert Jones, Jr.
(74) *Attorney, Agent, or Firm* — Westerman, Hattori, Daniels & Adrian, LLP

(57) ABSTRACT

A method for producing an aqueous pigment dispersion liquid, including: a kneading step of kneading a mixture of a quinacridone pigment (a), a pigment derivative (b), an organic high-molecular compound having an anionic group (c), a basic compound (d), and an acetylene glycol surfactant (e) in a closed kneader to prepare a pigment-kneaded material having a solid content in the range of 50% to 80% by mass; and a step of diluting the pigment-kneaded material with an aqueous medium. A method for producing a water-based ink for ink jet recording, including a step of diluting the aqueous pigment dispersion liquid with an aqueous medium.

6 Claims, No Drawings

METHODS FOR PRODUCING AQUEOUS PIGMENT DISPERSION LIQUID AND WATER-BASED INK FOR INK JET RECORDING

TECHNICAL FIELD

The present invention relates to methods for producing an aqueous pigment dispersion liquid and a water-based ink for ink jet recording.

BACKGROUND ART

Water-based inks, which contain water as the main solvent, are advantageously free from or have a lower level of fire risk and toxicity, such as mutagenicity, of solvent inks. Thus, water-based inks are the mainstream of ink jet recording inks except for industrial applications.

The characteristics required for ink jet recording inks include (1) formation of uniform images having good color development, high resolution, and a high concentration without blurring on recording media, (2) high ejection stability without clogging of the nozzle tip due to drying of ink, (3) good drying characteristics of inks on recording media, (4) good image fastness, and (5) high long-term storage stability.

In water-based inks for ink jet recording, dyes are used as colorants because of their high dissolution stability, little nozzle clogging, high color developability, and capability of printing high-quality images. However, images formed of dyes have problems of low water fastness and lightfastness.

In order to solve these problems, attempts to convert the colorant from dyes to pigments have been actively made. Although pigment inks are expected to have good water fastness and lightfastness, pigment inks have lower color developability than dye inks and have a nozzle clogging problem due to aggregation and sedimentation of pigment. Thus, methods for dispersing a fine pigment in an aqueous medium using a polymer dispersant and the dispersion methods themselves have been studied.

In order to produce pigment inks having good ink jet characteristics without nozzle clogging, it is necessary to disperse a particulate pigment in an aqueous medium so as to achieve the desired characteristics. However, even when a pigment dispersion liquid is produced by dispersing a pigment, the pigment dispersion liquid cannot function as an ink jet recording ink until the surface tension and viscosity of the pigment dispersion liquid are adjusted for various ejection systems exemplified by a piezoelectric system and a thermal system.

In the case of dye inks, ink jet recording inks can be produced by only adding a dye to an aqueous medium containing no color material. In the case of pigment inks, ink jet recording inks are generally produced by two steps in this technical field: a step of optimally dispersing a pigment in an aqueous medium and a step of preparing an ink suitable for ink jet recording from the resulting aqueous pigment dispersion liquid. Thus, the problem of aggregation and sedimentation of pigment must be solved in both aqueous pigment dispersion liquids and ink jet recording inks.

When a color material is used as a pigment in an aqueous ink jet recording ink, the concentration of pigment in the ink generally ranges from 0.5% to 10% by mass, and the concentration of pigment in a pigment dispersion liquid used for the preparation of the ink generally ranges from approximately 5% to 25% by mass. It is important to prevent aggregation of pigment present in a much higher concentration in pigment dispersion liquids than in inks and to consistently maintain the dispersion state.

Dispersion of pigment is generally reversible. Thus, unless a measure to prevent reaggregation of pigment is taken, it is difficult to maintain the dispersion state of dispersed pigment. In many cases, therefore, a resin having both a group called an anchor that has a high affinity for the pigment surface and a group called a chain that has an affinity for a dispersion medium (the term "dispersion medium", as used herein, refers to a liquid medium used for dispersion) or a binder resin is used as a dispersant, and a resin layer is formed on the surface of pigment particles to stabilize dispersion. (See, for example, Non-Patent Literature 1.)

A dispersion method including a pretreatment step of kneading a pigment and a polymer dispersant in advance is proposed as a method for forming a resin layer on the surface of pigment particles to stabilize dispersion (see, for example, Patent Literature 1). A resin layer can be more efficiently formed on the surface of pigment particles through a pretreatment step of kneading a pigment and a polymer dispersant in advance. This can form more stable dispersion, improve production efficiency, and decrease the pigment size.

Although pigment particles become finer, there is room for improvement in the storage stability of ink due to insufficient pigment dispersion stability. In particular, quinacridone pigments used for the production of magenta inks are hydrogen bond type pigments, which function as pigments via intermolecular hydrogen bonds. Thus, pigment particles aggregate strongly, and undispersed coarse particles tend to remain in the inks. Furthermore, dispersed fine pigment particles tend to reaggregate. This makes it more difficult to stabilize dispersion.

Addition of a pigment derivative as a pigment dispersant is known to solve this problem. Pigment derivatives have a chemical structure similar to that of pigments and have a group that can bind to a binder or has an affinity for a binder, such as a dialkylaminomethyl group, an arylamidemethyl group, a sulfonic acid amide group, a sulfonate group or a salt thereof, or a phthalimide group (see, for example, Patent Literature 1). It is assumed that a portion of a pigment derivative that is identical or similar in the chemical structure to a pigment is adsorbed onto the pigment and thereby improves the dispersion or dispersion stability of the pigment. For example, an aqueous pigment dispersion liquid containing a quinacridone pigment and a phthalimidemethylated quinacridone compound is proposed (see Patent Literature 2). An aqueous pigment dispersion containing a quinacridone pigment, a phthalimidemethylated quinacridone compound, and a quinacridone sulfonic acid compound is proposed (see Patent Literature 3).

However, it is sometimes difficult to disperse strongly aggregated coarse particles even using these methods.

When a cartridge is filled with an ink containing many coarse pigment particles, the coarse particles sediment with the lapse of time and are deposited in the vicinity of an ink ejection port of a nozzle. The deposition may impair ink ejection performance and cause blurring or a low print density in printed matter. Although a cartridge cleaning function, which is generally installed in printers, is used to remove the deposition, this method not only takes a lot of time and effort but also consumes a considerable amount of ink, thus increasing printing costs.

CITATION LIST

Patent Literature

PTL 1: Japanese Unexamined Patent Application Publication No. 2003-226832
PTL 2: Japanese Unexamined Patent Application Publication No. 2004-352932
PTL 3: Japanese Unexamined Patent Application Publication No. 2005-048006
PTL 4: WO 98/44059
PTL 5: WO 11/034043

Non Patent Literature

NPL 1: Yuki Ganryo Handobukku (Organic Pigment Handbook), pp. 63-64, (May 2006, the first edition, publishing office: Color Office)

SUMMARY OF INVENTION

Technical Problem

It is an object of the present invention to provide a method for producing an aqueous pigment dispersion that contains a quinacridone pigment and a small number of coarse pigment particles and has high storage stability. It is another object of the present invention to provide a water-based ink for ink jet recording using an aqueous pigment dispersion, the water-based ink having high storage stability and good ejection performance even after long-term storage.

Solution to Problem

The present inventors solved the problems by adding a pigment derivative (b) and an acetylene glycol surfactant during a pretreatment step of kneading a quinacridone pigment and a polymer dispersant in advance.

A method for adding an acetylene glycol surfactant in a pretreatment step is known (see, for example, Patent Literature 4 and Patent Literature 5). For example, in Patent Literature 4, an acetylene glycol surfactant is added in a dispersion step to produce an ink that has a low tendency to bleed on recording media and can achieve a large dot diameter at a low ink ejection rate. In Patent Literature 5, an acetylene glycol surfactant is added in a dispersion step to produce a pigment dispersion that improves the dispersion of a bisacetoacetanilide pigment and provides high gloss. However, Patent Literature 4 and Patent Literature 5 do not describe the presence or absence of aggregation or storage stability when quinacridone pigments are used.

The present invention provides a method for producing an aqueous pigment dispersion liquid, including: a kneading step of kneading a mixture of a quinacridone pigment (a), a pigment derivative (b), an organic high-molecular compound having an anionic group (c), a basic compound (d), and an acetylene glycol surfactant (e) in a closed kneader to prepare a pigment-kneaded material that is stiff at normal temperature and has a solid content in the range of 50% to 80% by mass; and a step of diluting the pigment-kneaded material with an aqueous medium.

The present invention also provides a method for producing a water-based ink for ink jet recording, including a step of diluting an aqueous pigment dispersion liquid with an aqueous medium, the aqueous pigment dispersion liquid being produced by the method for producing an aqueous pigment dispersion liquid.

Advantageous Effects of Invention

The present invention can provide the production of an aqueous pigment dispersion that contains a quinacridone pigment and a small number of coarse pigment particles and has high storage stability. The present invention can also provide a water-based ink for ink jet recording having high dispersion stability and good ejection performance even after long-term storage.

DESCRIPTION OF EMBODIMENTS (Quinacridone Pigment (a))

The quinacridone pigment (a) for use in the present invention may be of any conventional type. Specific examples of the quinacridone pigment (a) include dimethylquinacridone pigments, such as C.I. Pigment Red 122, dichloroquinacridone pigments, such as C.I. Pigment Red 202 and C.I. Pigment Red 209, unsubstituted quinacridones, such as C.I. Pigment Violet 19, and mixtures and solid solutions of at least two pigments selected from these pigments. The pigment may be a powdered, granular, or massive dry pigment, wet cake, or slurry.

(Pigment Derivative (b))

The pigment derivative (b) for use in the present invention may be a quinacridone, phthalocyanine, or azo pigment derivative generally used in the technical field of pigments. Pigment derivatives have a chemical structure similar to that of pigments and have a group that can bind to a binder or has an affinity for a binder, such as a dialkylaminomethyl group, an arylamidemethyl group, a sulfonic acid amide group, a sulfonate group or a salt thereof, or a phthalimide group (see Yuki Ganryo Handobukku (Organic Pigment Handbook), p. 64, May 2006, the first edition, publishing office: Color Office). A pigment or a portion having a chemical structure similar to that of a pigment binds strongly to the pigment through a hydrogen bond or π electron interaction.

In the present invention, quinacridone pigment derivatives are particularly preferred. Examples of the quinacridone pigment derivatives include pigment derivatives in which a dialkylaminomethyl group, an arylamidemethyl group, a sulfonic acid amide group, a sulfonate group or a salt thereof, or a phthalimide group is introduced into the pigment skeleton of the quinacridone pigments.

Among the quinacridone pigment derivatives (b), compounds represented by the following general formula (1) are more preferred.

[Chem. 1]

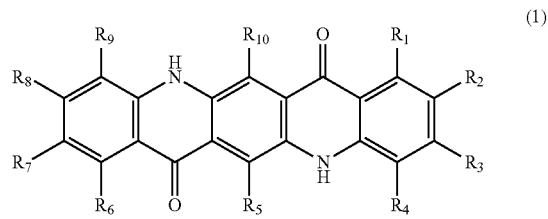

(1)

(In the formula (1), $R_1$ to $R_{10}$ independently denote a hydrogen atom, a chlorine atom, an alkyl or alkoxy group having 1 to 8 carbon atoms, or a group represented by the general formula (2)

[Chem. 2]

-continued

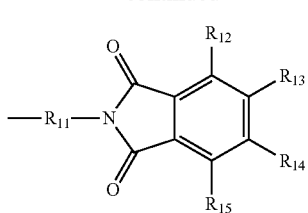
(2)

(in the formula (2), $R_{11}$ denotes an alkylene or alkenylene group having 1 to 8 carbon atoms, and $R_{12}$ to $R_{15}$ independently denote a hydrogen atom, an alkyl or alkoxy group having 1 to 8 carbon atoms, or a phenyl group), and at least one of $R_1$ to $R_{10}$ is a group represented by the formula (2).)

Among the compounds represented by the general formula (1), more preferred compounds include compounds represented by the general formula (3).

[Chem. 3]

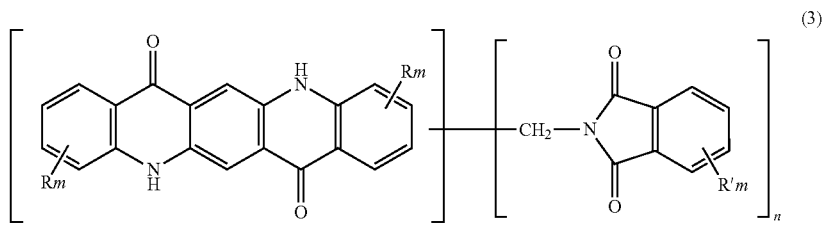
(3)

(wherein R and R' independently denote a hydrogen atom, a chlorine atom, or an alkyl or alkoxy group having 1 to 5 carbon atoms, m is an integer of 0, 1, or 2, and n is an integer in the range of 1 to 4)

Quinacridone pigment derivatives (b) having a group represented by the general formula (4) are still more preferred. In particular, phthalimidemethylated quinacridone compounds represented by the general formula (5) are still more preferred.

[Chem. 4]

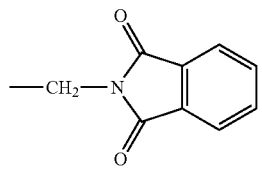
(4)

[Chem. 5]

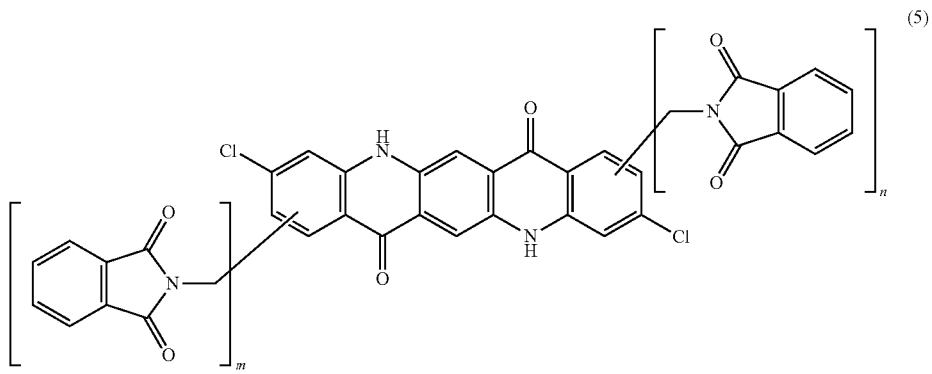
(5)

(In the formula (5), m and n independently denote an integer 0, 1, 2, or 3, provided that either m or n is not 0.)

The compounds represented by the general formula (5) are preferably compounds having one or a plurality of groups represented by the general formula (4) per molecule of the compounds, more preferably compounds having one to two groups represented by the general formula (4) per molecule in average, still more preferably compounds having 1 to 1.5 groups represented by the general formula (4) per molecule in average. One or more groups represented by the general formula (4) per molecule in average tend to have a good effect on dispersibility, and two or less groups per molecule in average are likely to have a good effect on dispersion stability.

Quinacridone pigment derivatives having the group represented by the general formula (4) can be synthesized by allowing unsubstituted quinacridone, dimethylquinacridone, or dichloroquinacridone, phthalimide, and formaldehyde or paraformaldehyde to react in concentrated sulfuric acid.

In an aqueous pigment dispersion liquid according to the present invention, the amount of the pigment derivative (b) to be used is preferably 1% or more by mass, more preferably 1% to 15% by mass, per 100% by mass of the quinacridone pigment (a). The amount of use in this range results in high storage stability of the resulting aqueous pigment dispersion liquids and ink jet recording inks. In particular, this results in a good ink ejection state in printing with thermal jet printers.

Furthermore, in order to reduce the amount of aggregate, the amount of pigment derivative to be added is still more preferably 5% or less by mass.

(Organic High-Molecular Compound Having Anionic Group (c))

For example, the organic high-molecular compound having an anionic group (c) for use in the present invention may be an organic high-molecular compound having a carboxy group, sulfonate group, or phosphate group. The organic high-molecular compound having an anionic group (c) may be a copolymer of (meth)acrylic acid and another copolymerizable ethylenically unsaturated monomer in consideration of the preparation of the compound and a wide choice and availability of monomers. The term "(meth)acrylic acid", as used herein, collectively refers to acrylic acid and methacrylic acid. This also applies to various esters of (meth)acrylic acid.

On the basis of the same acid value, in order to enhance the hydrophobicity of the copolymer and adsorption of the copolymer on the pigment surface, the other copolymerizable ethylenically unsaturated monomer may preferably be styrene, alkylstyrene, such as α-methylstyrene, β-methylstyrene, 2,4-dimethylstyrene, α-ethylstyrene, α-butylstyrene, or α-hexylstyrene, a halogenated styrene, such as 4-chlorostyrene, 3-chlorostyrene, or 3-bromostyrene, another styrene monomer, such as 3-nitrostyrene, 4-methoxystyrene, or vinyltoluene, or a (meth)acrylate monomer having a benzene ring, such as benzyl (meth)acrylate, phenyl (meth)acrylate, phenylethyl (meth)acrylate, phenylpropyl (meth)acrylate, or phenoxyethyl (meth)acrylate. Among these, styrene monomers, such as styrene, α-methylstyrene, and tert-butylstyrene, are particularly preferred.

Copolymers in the present invention may be any copolymers containing a polymerization unit of (meth)acrylic acid and a polymerization unit of another copolymerizable ethylenically unsaturated monomer as essential polymerization units and may be binary copolymers or terpolymers or multicomponent copolymers with another copolymerizable ethylenically unsaturated monomer.

Examples of the ethylenically unsaturated monomers include acrylates and methacrylates, such as methyl acrylate, methyl methacrylate, n-propyl acrylate, isopropyl acrylate, n-butyl acrylate, sec-butyl acrylate, tert-butyl acrylate, 2-ethylbutyl acrylate, 1,3-dimethylbutyl acrylate, hexyl acrylate, 2-ethylhexyl acrylate, octyl acrylate, ethyl methacrylate, n-butyl methacrylate, 2-methylbutyl methacrylate, pentyl methacrylate, heptyl methacrylate, and nonyl methacrylate; acrylate derivatives and methacrylate derivatives, such as 3-ethoxypropyl acrylate, 3-ethoxybutyl acrylate, dimethylaminoethyl acrylate, 2-hydroxyethyl acrylate, 2-hydroxybutyl acrylate, ethyl-α-(hydroxymethyl) acrylate, dimethylaminoethyl methacrylate, hydroxyethyl methacrylate, and hydroxypropyl methacrylate; aryl acrylates and aralkyl acrylates, such as phenyl acrylate, benzyl acrylate, phenylethyl acrylate, and phenylethyl methacrylate; monoacrylates and monomethacrylates of polyhydric alcohols, such as diethylene glycol, triethylene glycol, poly(ethylene glycol), glycerin, and bisphenol A; dialkyl maleates, such as dimethyl maleate and diethyl maleate, and vinyl acetate. One or two or more of these monomers may be added as a monomer component or monomer components.

Copolymers for use in the present invention may be linear copolymers composed only of polymerization units of monoethylenically unsaturated monomers or copolymers partly having a cross-linked moiety resulting from copolymerization with a very small amount of cross-linking ethylenically unsaturated monomer.

Examples of the cross-linking ethylenically unsaturated monomer include glycidyl (meth)acrylate, divinylbenzene, ethylene glycol di(meth)acrylate, propylene glycol di(meth)acrylate, poly(ethylene glycol) di(meth)acrylate, poly(oxyethylene-oxypropylene) glycol di(meth)acrylate, and poly(meth)acrylates of polyhydric alcohols, such as tri(meth)acrylates of glycerin alkylene oxide adducts.

In the present invention, on the assumption that the reaction rate of each monomer is substantially the same, the ratio of charged monomers is considered to be the ratio of polymerization units of the monomers on a mass basis. Copolymers in the present invention can be synthesized by various known reaction methods, such as bulk polymerization, solution polymerization, suspension polymerization, and emulsion polymerization. In these methods, commonly used polymerization initiators, chain transfer agents (polymerization modifiers), surfactants, and antifoaming agents may be used in combination.

In the case that copolymers have high acid values, or high dispersibility is not required, the copolymers may be used alone. Otherwise, in general, water-based inks for ink jet recording and aqueous pigment dispersions having higher dispersibility for use in water-based inks for ink jet recording can be produced by neutralizing anionic groups of copolymers with basic substances.

The organic high-molecular compound having an anionic group (c) for use in the present invention may particularly preferably be a styrene-acrylic acid copolymer containing a styrene monomer and (meth)acrylic acid as raw material monomers, such as a styrene-(meth)acrylic acid copolymer, a styrene-(meth)acrylate-(meth)acrylic acid copolymer, or a (meth)acrylate-(meth)acrylic acid copolymer, among the copolymers described above. (The term "styrene-acrylic acid copolymer", as used herein, refers to "copolymer containing a styrene monomer and (meth)acrylic acid as raw material monomers", as described above. Thus, a general-purpose monomer other than the styrene monomer and (meth)acrylic acid may be copolymerized.)

The percentage of a styrene monomer used as a raw material of such a styrene-acrylic acid copolymer preferably ranges from 50% to 90% by mass, particularly preferably 70% to 90% by mass. When the percentage of a styrene monomer is 50% or more by mass, the resulting styrene-acrylic acid copolymers have a high affinity for the quinacridone pigment (a), and the resulting aqueous pigment dispersion liquids tend to have improved dispersion stability. Furthermore, water-based inks for ink jet recording produced from such aqueous pigment dispersion liquids tend to have improved plain paper recording characteristics, high image recording densities, and high water fastness. When the percentage of a styrene monomer is 90% or less by mass, quinacridone pigments coated with the styrene-acrylic acid copolymer can maintain high dispersibility in an aqueous medium, and the resulting aqueous pigment dispersion liquids can have improved dispersion and dispersion stability of the pigments. Furthermore, the resulting ink jet recording inks have high print stability.

The styrene-acrylic acid copolymer is produced by copolymerization of a styrene monomer and at least one of acrylic acid monomers and methacrylic acid monomers. An acrylic acid and a methacrylic acid are preferably used in combination. This is because this tends to improve copolymerization in resin synthesis, improve resin homogeneity and consequently storage stability, and form a pigment dispersion liquid containing fine particles.

In the styrene-acrylic acid copolymer, the total of a styrene monomer, an acrylic acid monomer, and a methacrylic acid monomer in copolymerization is preferably 95% or more by mass of all the monomer components of the styrene-acrylic acid copolymer.

The styrene-acrylic acid copolymer can be produced by an ordinary polymerization method, for example, by solution polymerization, suspension polymerization, bulk polymerization, or another polymerization method in the presence of a polymerization catalyst. Examples of the polymerization catalyst include 2,2'-azobis(2,4-dimethylvaleronitrile), 2,2'-azobisisobutyronitrile, 1,1'-azobis(cyclohexane-1-carbonitrile), benzoyl peroxide, dibutyl peroxide, and butyl peroxybenzoate. The amount of polymerization catalyst to be used preferably ranges from 0.1% to 10.0% by mass of the vinyl monomer component(s).

The styrene-acrylic acid copolymer may be a random copolymer, a graft copolymer, or a block copolymer. The graft copolymer may include polystyrene or a copolymer of styrene and a nonionic monomer copolymerizable with styrene as a main chain or side chain and a copolymer of acrylic acid, methacrylic acid, and another monomer including styrene as a side chain or main chain. The styrene-acrylic acid copolymer may be a mixture of the graft copolymer and a random copolymer. The block copolymer may be of a known A-B or A-B-A type (A and B denote a polymer unit of a styrene monomer or a polymer unit of an acrylic acid monomer or methacrylic acid monomer).

The organic high-molecular compound having an anionic group (c) for use in the present invention preferably has a weight-average molecular weight in the range of 5000 to 20000. For example, when the styrene-acrylic acid copolymer is used, the styrene-acrylic acid copolymer preferably has a weight-average molecular weight in the range of 5000 to 20000, more preferably 5000 to 18000, particularly preferably 5500 to 15000.

A weight-average molecular weight of 5000 or more tends to result in improved long-term storage stability of the aqueous pigment dispersion liquid and reduction in sedimentation due to aggregation of pigment, although this slightly reduces the ease of initial dispersion and particle size reduction of the quinacridone pigment (a). When the styrene-acrylic acid copolymer has a weight-average molecular weight of 20000 or less, ink jet recording inks produced from aqueous pigment dispersion liquids containing the styrene-acrylic acid copolymer tend to have an appropriate viscosity and improved ink ejection stability.

The weight-average molecular weight herein is measured by gel permeation chromatography (GPC) and refers to a polystyrene equivalent molecular weight based on polystyrene standards.

When the organic high-molecular compound having an anionic group (c) for use in the present invention is a styrene-acrylic acid copolymer, the styrene-acrylic acid copolymer has a carboxy group of an acrylic acid monomer and a methacrylic acid monomer. The styrene-acrylic acid copolymer preferably has an acid value in the range of 120 to 220 (mgKOH/g), more preferably 150 to 200 (mgKOH/g). An acid value of 120 (mgKOH/g) or more results in sufficient hydrophilicity, and such an aqueous pigment dispersion liquid tends to have high pigment dispersion stability. An acid value of 220 (mgKOH/g) or less results in less likelihood of aggregation of pigment, and materials printed with ink jet recording inks produced from such an aqueous pigment dispersion liquid tends to retain sufficient water fastness.

The acid value herein is measured according to Japanese Industrial Standards "K 0070:1992. Test methods for acid value, saponification value, ester value, iodine value, hydroxyl value and unsaponifiable matter of chemical products" and corresponds to the amount of potassium hydroxide (mg) that is required to completely neutralize 1 g of resin.

An excessively low acid value unfavorably results in low pigment dispersibility and storage stability, and a water-based ink for ink jet recording described below has low print stability. An excessively high acid value also unfavorably results in low water fastness of colored recorded images. Copolymers having an acid value in this range may be produced by copolymerization such that (meth)acrylic acid can provide the acid value described above.

In the kneading step, the mass ratio c/(a+b) of the organic high-molecular compound having an anionic group (c to the total mass of the quinacridone pigment (a) and the pigment derivative (b)) ranges from 0.01 to 0.5.

In order to neutralize an acrylic acid moiety of the organic high-molecular compound having an anionic group (c), the organic high-molecular compound having an anionic group (c) is used in the presence of the basic compound (d). The basic compound (d) softens a resin in the kneading step, facilitates coating of pigment with the resin, and improves dispersion of the resin-coated pigment in an aqueous medium. The basic compound (d) may be an inorganic basic compound or an organic basic compound. Examples of the organic basic compound include amines, such as methylamine, dimethylamine, trimethylamine, ethylamine, diethylamine, and triethylamine; and alcohol amines, such as triethanolamine, diethanolamine, and methyldiethanolamine. Examples of the inorganic basic compound include hydroxides of alkali metals, such as potassium and sodium; carbonates of alkali metals, such as potassium and sodium; carbonates of alkaline-earth metals, such as calcium and barium; and ammonium hydroxide. When the basic compound (d) is an inorganic basic compound, a proper amount of water or alcohol must be used together with the inorganic basic compound.

In particular, alkali metal hydroxides and alcohol amines in pigment dispersions, aqueous pigment dispersion liquids, and ink jet recording inks prepared in the present invention are preferred in terms of dispersibility, storage stability, the decapping properties of ink jet printers, and the water fastness of printed materials. Among these basic compounds (d), alkali metal hydroxides, such as potassium hydroxide, sodium hydroxide, and lithium hydroxide, contribute to low viscosities of aqueous pigment dispersion liquids and are preferred in terms of the ejection stability of ink jet recording inks. In particular, potassium hydroxide is preferred.

Alkali metal hydroxides are preferably used in the form of aqueous solution. The amount of alkali metal hydroxide to be added depends on the acid value of the organic high-molecular compound having an anionic group (c) and is preferably in the range that results in a neutralization rate in the range of 80% to 120% by mass. A neutralization rate of 80% or more by mass is preferred in order to improve the dispersion speed in an aqueous medium in the production of aqueous pigment dispersion liquids from pigment-kneaded materials and in terms of the dispersion stability and storage stability of aqueous pigment dispersion liquids. A neutralization rate of 120% or less by mass is preferred in order to prevent gelation of aqueous pigment dispersion liquids or ink jet recording inks during long-term storage and in terms of the water fastness of printed matter printed with the inks.

The neutralization rate herein indicates the mass percentage of the amount of basic compound (d) based on the amount required to neutralize all the carboxy groups of the organic high-molecular compound having an anionic group (c) and is calculated using the following equation.

$$\text{Neutralization rate (\%)} = [\{\text{Mass of basic compound (g)} \times 56.11 \times 1000\}/\{\text{acid value of resin(mgKOH/g)} \times \text{equivalent of basic compound} \times \text{amount of resin(g)}\}] \times 100 \quad [\text{Math. 1}]$$

(Acetylene Glycol Surfactant (e))

The acetylene glycol surfactant (e) for use in the present invention is not particularly limited and may be a known acetylene glycol surfactant (e). For example, a surfactant containing an acetylene glycol compound may be used. More specifically, a surfactant containing a compound represented by the general formula (6) is preferred.

[Chem. 6]

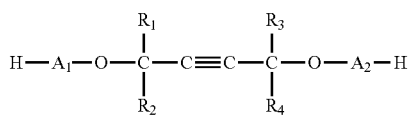

(6)

(In the general formula (6), $R_1$, $R_2$, $R_3$, and $R_4$ independently denote a straight chain or branched alkyl group having 1 to 8 carbon atoms in the main chain, and A and $A_2$ independently denote a single bond or an alkylene oxide group having 1 to 20 repeating units (an oxygen atom at one end of the alkylene oxide group is bonded to a hydrogen atom, and a carbon atom at the other end is bonded to an oxygen atom).)

In the general formula (6), $R_1$, $R_2$, $R_3$, and $R_4$ independently denote a straight chain or branched alkyl group having 1 to 8 carbon atoms in the main chain. In the acetylene glycol compound, the number of carbon atoms in the main chain of the alkyl group each represented by $R_1$, $R_2$, $R_3$, and $R_4$ preferably ranges from 1 to 6, more preferably 1 to 4. In particular, $R_1$ and $R_3$ preferably denote a methyl group, and $R_2$ and $R_4$ preferably independently denote one selected from the group consisting of a methyl group, an ethyl group, a propyl group, a butyl group, and an isobutyl group. Most preferably, $R_1$ and $R_3$ denote a methyl group, and $R_2$ and $R_4$ denote an isobutyl group.

In the general formula (6), $A_1$ and $A_2$ independently denote a single bond or an alkylene oxide group having 1 to 20 repeating units. The alkylene oxide group is preferably an ethylene oxide group or a propylene oxide group, and the structure of propylene oxide group may be linear or branched.

As long as the number of repeating units ranges from 1 to 20, an ethylene oxide group may be adjacent to a propylene oxide group. For example, $A_1$ and $A_2$ may denote an ethylene oxide group; $A_1$ may denote an ethylene oxide group, and $A_2$ may denote a propylene oxide group; or $A_1$ may denote a group in which an ethylene oxide group is linked to a propylene oxide group, and $A_2$ may denote an ethylene oxide group.

The number of repeating units in the alkylene oxide group in the general formula (6) is not particularly limited. However, when the number of repeating units in an ethylene oxide group is excessively large, the compound represented by the general formula (6) has high hydrophilicity and may not act on pigment.

Even when $A_1$ and $A_2$ denote a single bond, that is, the compound has no alkylene oxide group, aqueous pigment dispersion liquids having high storage stability can also be produced.

The compound represented by the general formula (6) may be used alone, or a plurality of compounds represented by the general formula (6) may be used in combination.

For example, in the compound represented by the general formula (6), $R_1$ and $R_3$ may denote a methyl group, $R_2$ and $R_4$ may denote an isobutyl group, and $A_1$ and $A_2$ may denote a single bond. Alternatively, in the compound represented by the general formula (6), $R_1$ and $R_3$ may denote a methyl group, $R_2$ and $R_4$ may denote an isobutyl group, and $A_1$ and $A_2$ may denote an ethylene oxide group having 1 to 20 repeating units. Alternatively, in the compound represented by the general formula (6), $R_1$ and $R_3$ may denote a methyl group, $R_2$ and $R_4$ may denote an isobutyl group, $A_1$ may denote a group in which an ethylene oxide group is linked to a propylene oxide group, and $A_2$ may denote an ethylene oxide group.

These compounds may be used alone or in combination. A surfactant having another structure may be used without losing the advantages of the present invention. Specific examples of the compound used as a surfactant in combination with the compound represented by the general formula (6) include polyoxyethylene alkyl ethers and polyoxyethylene alkylphenyl ethers.

In the present invention, the acetylene glycol surfactant (e) in a step of kneading and dispersing the quinacridone pigment (a) may be composed of 100% by mass of the compound represented by the general formula (6) or may be the compound represented by the general formula (6) diluted with another compound.

More specifically, on the basis of the additive amount in kneading and dispersion of the quinacridone pigment (a), the amount of the compound represented by the general formula (6) preferably ranges from 0.001% to 20% by mass, more preferably 0.01% to 10% by mass, preferably 0.02% or more by mass, more preferably 0.04% or more by mass, of the total amount of the quinacridone pigment (a) and the pigment derivative (b).

A content of less than 0.001% by mass may result in a small effect of the addition of the surfactant. A content of more than 20% by mass may result in no difference in the effect even when the additive amount is increased.

The amount of the acetylene glycol surfactant (e) to be added during kneading and dispersion of the pigment is preferably not more than 10 times, more preferably not more than 5 times, the amount of the pigment derivative (b). When the amount of the acetylene glycol surfactant (e) is more than 10 times the amount of the pigment derivative (b), the acetylene glycol surfactant (e) reduces the effect of the addition of the pigment derivative (b), and the ejection characteristics of an ink jet recording ink produced from an aqueous pigment dispersion liquid of the present invention deteriorate after left standing for extended periods. Thus, strong cleaning may be required to recover the normal ejection state, or normal ejection cannot be recovered even after cleaning.

It is assumed that the acetylene glycol surfactant (e) functions as a kneading aid in the present invention.

It is assumed that the acetylene glycol surfactant (e) added in the preparation of a pigment-kneaded material from the quinacridone pigment (a), the pigment derivative (b), the organic high-molecular compound having an anionic group (c), and the basic compound (d) functions as a kneading aid, wets the pigment surface, and reduces energy required to deflocculate strongly aggregated pigment particles. This facilitates adsorption of the organic high-molecular compound having an anionic group (c) on the surface of the quinacridone pigment (a), prevents crosslinking and aggregation of the quinacridone pigment (a) during the preparation of the pigment-kneaded material, and provides an aqueous pigment dispersion liquid that can be very easily dispersed in an aqueous medium.

Among the acetylene glycol surfactants (e) for use in the present invention, in the compound having an alkylene oxide group represented by the general formula (6), the number of repeating units in the group can be changed to adjust the water solubility and the affinity for pigment of the acetylene glycol surfactant (e).

Because pigments are generally hydrophobic, a surfactant added to a pigment and water tends to dissolve in water, and the effects of the surfactant on the pigment tends to decrease. Thus, in the present invention, kneading is performed at a solid content in the range of 50% to 80% by mass, that is, at a minimized water content of the system. It is assumed that this can enhance the effects of the acetylene glycol surfactant (e) on the quinacridone pigment (a) and allows pigment particles to be well dispersed.

The pigment-kneaded material prepared in this manner is a stiff kneaded material having a low water content and flows negligibly at normal temperature and pressure.

(Water-Soluble Organic Solvent (f))

In the present invention, if necessary, a water-soluble organic solvent (f) may be added in the kneading step of preparing a pigment-kneaded material. The water-soluble organic solvent (f) is not particularly limited and may be a known water-soluble organic solvent. Examples of the water-soluble organic solvent (f) include glycols, such as ethylene glycol, diethylene glycol, triethylene glycol, tetraethylene glycol, propylene glycol, poly(ethylene glycol), and poly(propylene glycol); diols, such as butanediol, pentanediol, hexanediol, and their homologs; glycol esters, such as propylene glycol laurate; glycol ethers, such as ethers, including diethylene glycol monoethyl ether, diethylene glycol monobutyl ether, and diethylene glycol monohexyl ether, cellosolves, including propylene glycol ether, dipropylene glycol ether, and triethylene glycol ether, and glycerin polyethylene adducts, glycerin polyoxypropylene adducts, and glycerin polyoxypropylene and polyoxyethylene adducts; alcohols, such as methanol, ethanol, isopropyl alcohol, 1-propanol, 2-propanol, 1-butanol, 2-butanol, butyl alcohol, pentyl alcohol, and their homologs; sulfolane; lactones, such as γ-butyrolactone; lactams, such as pyrrolidone, N-methyl-2-pyrrolidone, and γ-butyrolactone; glycerin and derivatives thereof, and other various solvents known as water-soluble organic solvents. These water-soluble organic solvents may be used alone or in combination.

Among these, preferred are polyhydric alcohols having a high boiling point, low volatility, and high surface tension, particularly glycols, such as diethylene glycol and triethylene glycol.

The mass ratio of the water-soluble organic solvent (f) to the quinacridone pigment (a) is preferably 1/5 or more, most preferably 1/3 or more. When the mass ratio of the water-soluble organic solvent to the pigment is 1/3 or more, kneading can be performed in the presence of a certain amount of solvent from the beginning to the end of the kneading step.

Although the mass ratio of the water-soluble organic solvent (f) to the organic high-molecular compound having an anionic group (c) is not particularly limited, the mass ratio preferably ranges from approximately 1/2 to 5/1, more preferably 1/1 to 4/1.

The water-soluble organic solvent (f) for use in the present invention preferably has a hydrogen bonding solubility parameter δh in the range of 7 to 13. Such a water-soluble organic solvent (f) can greatly decrease the number of poorly dispersed coarse particles.

The solubility parameters herein are Hansen solubility parameters. The Hansen solubility parameters are obtained by dividing the Hildebrand solubility parameter into three components: a dispersion parameter δd, a polarity parameter δp, and a hydrogen bonding parameter δh, and plotting them in the three-dimensional coordinate system. The present invention employs only the δh parameter.

Many dispersion parameters δd, polarity parameters δp, and hydrogen bonding parameters δh were measured by Hansen and his successors and are described in detail in Polymer Handbook (fourth edition), VII-698-711. The Hansen solubility parameters of many solvents and resins were investigated and are described in Wesley L. Archer, Industrial Solvents Handbook, for example.

Use of the water-soluble organic solvent (f) having a hydrogen bonding parameter δh in the range of 7 to 13 can decrease the number of coarse particles in an aqueous pigment dispersion liquid containing the quinacridone pigment (a). Examples of the water-soluble organic solvent (f) having a hydrogen bonding parameter δh in the range of 7 to 13 include acetone (7.0), ethyl acetate (7.2), N-methyl-2-pyrrolidone (7.2), poly(ethylene glycol) (molecular weight=200, 300, 400, 600, and 1,000; δh are 7.3, 7.4, 7.6, and 7.8, respectively), γ-butyrolactone (7.4), a glycerin polyoxypropylene adduct (molecular weight=600; δh is 9.2), glycerin polyethylene adducts (molecular weight=600 and 1300; δh are 12.5 and 9.7, respectively), and a glycerin polyoxypropylene and polyoxyethylene adduct (molecular weight=600; δh is 10.0).

The hydrogen bonding parameter δh of each water-soluble organic compound is described in the parentheses and is expressed in $cal^{0.5}/cm^{1.5}$.

In general, a mixture containing a resin and a pigment is kneaded by adding a proper amount of water-soluble organic compound to the mixture to form a clayey mass having a high solid content and kneading the mass under high shear force. The water-soluble organic compound preferably has a high boiling point because the water-soluble organic compound is not easily vaporized during kneading. Even when the water-soluble organic compound remains in the kneaded material, the water-soluble organic compound can be added to the kneaded material as a component of the aqueous medium in a downstream mixing step and need not be removed. In particular, because the kneaded material has a very high temperature in the kneading and dispersion step, low-boiling organic compounds are likely to be volatilized, and kneading may be insufficient. Thus, the water-soluble organic solvent (f) preferably has a boiling point of 180° C. or more, more preferably 200° C. or more.

The water-soluble organic solvent (f) having a hydrogen bonding parameter δh in the range of 7 to 13 and a boiling point of 180° C. or more may be a poly(ethylene glycol) having a molecular weight of 300 (for example, trade name "PEG-300 (manufactured by Sanyo Chemical Industries, Ltd.)" (δh=7.4, boiling point=250° C.).

A method for producing an aqueous pigment dispersion liquid according to the present invention will be further described below, in which the organic high-molecular compound having an anionic group (c) is a styrene-acrylic acid copolymer.

(Kneading Step)

In the kneading step in a production method according to the present invention, a mixture containing the quinacridone pigment (a), the pigment derivative (b), the organic high-molecular compound having an anionic group (c), the basic compound (d), and the acetylene glycol surfactant (e) is kneaded to prepare a pigment-kneaded material that has a solid content in the range of 50% to 80% by mass and is stiff and flows negligibly at normal temperature and pressure.

The solid content of the mixture, more specifically, the total solid content of the quinacridone pigment (a), the pigment derivative (b), and the organic high-molecular compound having an anionic group (c) ranges from 50% to 80% by mass, preferably 60% to 80% by mass, of the pigment-kneaded material. A solid content of less than 50% by mass unfavorably results in insufficient kneading and insufficient crushing of the pigment due to a low viscosity of the mixture. The solid content can be increased to maintain an appropriately high viscosity of the kneaded material during kneading, increase shear applied to the kneaded material by a kneader during kneading, and simultaneously perform pulverization of the pigment in the kneaded material and coating of the pigment with the organic high-molecular compound having an anionic group (c). A solid content of more than 80% by mass results in difficulty in kneading even when the organic high-molecular compound having an anionic group (c) is sufficiently softened by heating. This also results in difficulty in dissolution and dispersion in the aqueous medium in the production of an aqueous pigment dispersion liquid and makes it difficult to reduce the viscosity with a water-soluble solvent.

Also in order to maintain a high viscosity, a closed kneader should be used in a kneading method described later, and the mass of the mixture during kneading should be 90% or more of the mass of the mixture before kneading.

All of the quinacridone pigment (a), the pigment derivative (b), and the organic high-molecular compound having an anionic group (c) to be contained in an aqueous pigment dispersion liquid are compounded in the kneading step in the present invention. In the kneading step, the mass ratio c/(a+b) of the organic high-molecular compound having an anionic group (c) to the total mass of the quinacridone pigment (a) and the pigment derivative (b) preferably ranges from 0.01 to 0.5.

In particular, when the organic high-molecular compound having an anionic group (c) is a styrene-acrylic acid copolymer, the mass ratio (c)/(a+b) preferably ranges from 0.05 to 0.5, more preferably 0.1 to 0.45, still more preferably 0.15 to 0.4. At a mass ratio (c)/(a+b) of 0.05 or more, the surface of the quinacridone pigment (a) and the pigment derivative (b) is sufficiently coated with the styrene-acrylic acid copolymer. Thus, an ink jet recording ink produced from such an aqueous pigment dispersion liquid tends to have improved dispersion stability, and materials printed with the ink jet recording ink tends to have improved rub resistance. At a mass ratio (c)/(a+b) of 0.5 or less, in the production of an aqueous pigment dispersion liquid or a water-based ink for ink jet recording, the styrene-acrylic acid copolymer in the aqueous medium tends to be entirely adsorbed on the quinacridone pigment (a), the aqueous pigment dispersion liquid and the water-based ink tend to retain an appropriate viscosity, and the water-based ink tends to retain good ejection performance.

The kneading temperature can be appropriately controlled in consideration of the temperature characteristics of the styrene-acrylic acid copolymer such that a sufficient shear force is applied to the kneaded material. The kneading temperature is preferably lower than the glass transition point of the styrene-acrylic acid copolymer, and the temperature difference between the kneading temperature and the glass transition point is preferably less than 50° C. Kneading in such a temperature range does not cause an insufficient shear force due to a decrease in viscosity of the kneaded material, which is associated with the melting of the styrene-acrylic acid copolymer due to increased kneading temperatures.

A kneader used in the kneading step may be any kneader that can generate a high shear force applied to a mixture having a high solid content, and may be selected from known kneaders. Kneaders having impeller blades and a mixing vessel that can be tightly closed are preferred to open kneaders having no mixing vessel, such as two-roll mills. It is preferable to have a mixing vessel and impeller blades and use a kneader. In such a kneader, the water-soluble organic solvent (f) and water are not vaporized during kneading, and a mixture having a certain solid content can be continuously kneaded. This can effectively reduce the number of coarse particles. The pigment composition after kneading can be transferred to a mixing step in which the pigment composition is directly diluted with an aqueous medium to produce an aqueous pigment dispersion liquid.

Such an apparatus may be a Henschel mixer, a pressure kneader, a Banbury mixer, or a planetary mixer. In particular, a planetary mixer is preferred. Because kneading in the present invention is performed at a high solid content in the range of 50% to 80% by mass, the viscosity of the pigment-kneaded material varies widely depending on the kneading state of the pigment-kneaded material. Planetary mixers can be used for kneading in a wider viscosity range than two-roll mills. In planetary mixers, addition and vacuum distillation of an aqueous medium are also possible, and viscosity and load shear force during kneading can be easily controlled.

(Dilution Step)

A pigment-kneaded material having a solid content in the range of 50% to 80% by mass prepared in the kneading step is diluted with an aqueous medium to produce an aqueous pigment dispersion liquid. More specifically, a pigment-kneaded material is prepared in a kneader including a mixing vessel as described above. An aqueous medium is added to the mixing vessel. The pigment-kneaded material is directly diluted with the aqueous medium while stirring, if necessary, thus producing an aqueous pigment dispersion liquid. Alternatively, the pigment-kneaded material may be mixed with an aqueous medium in another mixer having impeller blades while stirring, if necessary, thus producing an aqueous pigment dispersion liquid.

Regarding the mixing of an aqueous medium, a required amount of the aqueous medium may be mixed with the pigment-kneaded material at once. However, continuous or intermittent addition of a required amount of the aqueous medium can efficiently dilute the pigment-kneaded material in a shorter time to produce an aqueous pigment dispersion liquid. The aqueous pigment dispersion liquid thus produced may be further dispersed with a dispersing apparatus.

In a production method according to the present invention, the quinacridone pigment (a) is effectively decreased in its size and is effectively coated with the organic high-molecular compound having an anionic group (c). Thus, even if a further shear force is not applied to crush the quinacridone pigment (a) in dispersion treatment with a dispersing apparatus, only mixing with an aqueous medium to decrease the solid content for liquefaction and, if necessary, agitation can produce an aqueous pigment dispersion liquid having satisfactory characteristics. When coarse dispersed particles remain in the aqueous pigment dispersion liquid due to variations in pigment characteristics, however, the dispersion treatment may pulverize the remaining coarse dispersed particles and decrease the size of the dispersed particles, thereby improving the ink jet characteristics, such as ejection stability and print density, of an ink jet recording ink produced from the aqueous pigment dispersion liquid.

(Aqueous Medium)

The aqueous medium may be any aqueous medium that has been used in the preparation of water-based inks for ink jet recording. More specifically, the aqueous medium may be water or a mixture of water and the following water-soluble organic solvent. Examples of the water-soluble organic solvent include monovalent and polyvalent alcohols, amides, ketones, keto-alcohols, cyclic ethers, glycols, lower alkyl ethers of polyhydric alcohols, poly(alkylene glycol)s, polyols, such as glycerin, N-methyl-2-pyrrolidone, 2-pyrrolidone, 1,3-dimethyl-2-imidazolidinone, glycerin, ethylene glycol, diethylene glycol, triethylene glycol, tetraethylene glycol, propylene glycol, dipropylene glycol, poly (propylene glycol), 1,3-propanediol, 1,4-butanediol, 1,5-pentanediol, 1,6-hexanediol, 1,2,6-hexanetriol, trimethylolpropane, and pentaerythritol, polyhydric alcohol alkyl ethers, such as diethylene glycol monobutyl ether and tetraethylene glycol monomethyl ether, polyhydric alcohol aryl ethers and polyhydric alcohol aralkyl ethers, such as ethylene glycol monophenyl ether and ethylene glycol monobenzyl ether, lactams, such as 2-pyrrolidone, N-methyl-2-pyrrolidone, and ε-caprolactam, 1,3-dimethyl-imidazolidinoneacetone, N-methyl-2-pyrrolidone, γ-butyrolactone, glycerin polyoxyalkylene adducts, tetrahydrofuran, 1,4-dioxane, dioxolane, propylene glycol monomethyl ether acetate, dimethyl sulfoxide, diacetone alcohol, and dimethylformamide propylene glycol monomethyl ether. These may be used alone or in combination.

In general, water is mainly used, and a water-soluble organic solvent other than water is appropriately used together with water.

The total amount of aqueous media in the aqueous pigment dispersion liquid preferably ranges from 1% to 50% by mass, more preferably 3% to 40% by mass.

(Dispersing Apparatus)

The dispersing apparatus for dispersion treatment may be any commonly used apparatus, such as an ultrasonic homogenizer, a high-pressure homogenizer, a paint shaker, a ball mill, a rolling mill, a sand mill, a sand grinder, Dyno-Mill, Dispermat, a nano mill, an SC mill, or Nanomizer. These apparatuses may be used alone or in combination. The terms "dispersing apparatus" and "disperser", as used herein, refer to apparatuses designed specifically for dispersion treatment processes and do not include general-purpose blenders and mixers generally and widely used for mixing and agitation.

The aqueous pigment dispersion liquid produced in the mixing step or by dispersion treatment after the mixing step preferably has a pigment concentration in the range of 5% to 25% by mass.

(Preparation of Water-Based Ink for Ink Jet Recording)

A water-based ink for ink jet recording produced from an aqueous pigment dispersion liquid according to the present invention can be prepared using routine procedures by diluting the aqueous pigment dispersion liquid with an aqueous medium and, if necessary, adding various additive agents. Since coarse particles can cause nozzle clogging and degradation of image characteristics, coarse particles may be removed by centrifugation or filtration after the preparation of water-based inks for ink jet recording.

In the preparation of ink jet recording inks from an aqueous pigment dispersion liquid according to the present invention, the water-soluble organic solvent (f) or a wetting agent used in this technical field may be added in order to prevent drying of the inks. The total amount of the water-soluble organic solvent (f) and a wetting agent in inks preferably ranges from 3% to 50% by mass.

In the preparation of ink jet recording inks from an aqueous pigment dispersion liquid according to the present invention, a penetrant may be added in order to improve penetration into recording media and adjust the dot diameter on recording media.

Examples of the penetrant include lower alcohols, such as ethanol and isopropyl alcohol, alkyl alcohol ethylene oxide adducts, such as ethylene glycol hexyl ether and diethylene glycol butyl ether, and alkyl alcohol propylene oxide adducts, such as propylene glycol propyl ether.

The penetrant content of inks preferably ranges from 0.01% to 10% by mass.

In the preparation of ink jet recording inks from an aqueous pigment dispersion liquid according to the present invention, a surfactant may be added to adjust the ink characteristics, such as surface tension. The surfactant to be added for this purpose is not particularly limited and may be an anionic surfactant, a nonionic surfactant, a cationic surfactant, or an amphoteric surfactant. Among these, an anionic surfactant and a nonionic surfactant are preferred.

Since an aqueous pigment dispersion liquid according to the present invention already contains a certain amount of the acetylene glycol surfactant (e), the amount of surfactant to be added here is preferably limited such that the aqueous pigment dispersion liquid has desired surface tension.

Examples of the anionic surfactant include alkylbenzene sulfonates, alkylphenyl sulfonates, alkylnaphthalene sulfonates, higher fatty acid salts, sulfate ester salts of higher fatty acid esters, sulfonates of higher fatty acid esters, sulfate ester salts and sulfonates of higher alcohol ethers, higher alkyl sulfosuccinates, polyoxyethylene alkyl ether carboxylates, polyoxyethylene alkyl ether sulfates, alkyl phosphates, and polyoxyethylene alkyl ether phosphates. Specific examples of these anionic surfactants include dodecylbenzene sulfonate, isopropylnaphthalene sulfonate, monobutylphenylphenol monosulfonate, monobutylbiphenyl sulfonate, and dibutylphenylphenol disulfonate.

Examples of the nonionic surfactant include polyoxyethylene alkyl ethers, polyoxyethylene alkylphenyl ethers, polyoxyethylene fatty acid esters, sorbitan fatty acid esters, polyoxyethylene sorbitan fatty acid esters, polyoxyethylene sorbitol fatty acid esters, glycerin fatty acid esters, polyoxyethylene glycerin fatty acid esters, polyglycerin fatty acid esters, sucrose fatty acid esters, polyoxyethylene alkylamines, polyoxyethylene fatty acid amides, fatty acid alkylol amides, alkylalkanolamides, acetylene glycol, acetylene glycol polyoxyethylene adducts, and poly(ethylene glycol) poly(propylene glycol) block copolymers. Among these, preferred are polyoxyethylene nonylphenyl ether, polyoxyethylene octylphenyl ether, polyoxyethylene dodecylphenyl ether, polyoxyethylene alkyl ethers, polyoxyethylene fatty acid esters, sorbitan fatty acid esters, polyoxyethylene sorbitan fatty acid esters, fatty acid alkylol amides, acetylene glycol, acetylene glycol polyoxyethylene adducts, and poly(ethylene glycol) poly(propylene glycol) block copolymers.

Examples of other surfactants include silicone surfactants, such as polysiloxane oxyethylene adducts; fluorinated surfactants, such as perfluoroalkyl carboxylates, perfluoroalkyl sulfonates, and oxyethylene perfluoroalkyl ethers; and biosurfactants, such as spiculisporic acid, rhamnolipid, and lysolecithin.

These surfactants may be used alone or in combination. Considering the dissolution stability of surfactants, the surfactants preferably have a HLB in the range of 7 to 20. When a surfactant is added, the amount of the surfactant preferably ranges from 0.001% to 1% by mass, more preferably 0.001% to 0.5% by mass, still more preferably 0.01% to 0.2% by mass, of the total mass of ink. When the amount of the surfactant is 0.001% or more by mass, the effects of the addition of the surfactant are produced satisfactorily. When the amount of the surfactant is 1% or less by mass, problems such as blurring of images tend to be reduced.

In the preparation of ink jet recording inks from an aqueous pigment dispersion liquid according to the present invention, a preservative, a viscosity modifier, a pH-adjusting agent, a chelator, a plasticizer, an antioxidant, and/or an ultraviolet absorber may be added, if necessary.

The total amount of the quinacridone pigment (a) and the pigment derivative (b) in an aqueous pigment dispersion liquid according to the present invention preferably ranges from 5% to 25% by mass, more preferably 5% to 20% by mass. When the total amount of the quinacridone pigment (a) and the pigment derivative (b) is 5% or more by mass, an ink jet recording ink prepared from an aqueous pigment dispersion liquid according to the present invention tends to have satisfactory coloring characteristics and produce sufficient image densities. When the total amount is 25% or less by mass, degradation of the pigment dispersion stability of the aqueous pigment dispersion liquid is less likely to occur.

The total amount of the quinacridone pigment (a) and the pigment derivative (b) in an ink jet recording ink prepared from an aqueous pigment dispersion liquid according to the present invention preferably ranges from 1% to 10% by mass in order to achieve sufficient image densities and ensure the dispersion stability of dispersed particles in the ink.

An ink jet recording ink produced by a production method according to the present invention can maintain high dispersion stability even when heated and can be suitably used as an ink for various ink jet recording systems. The ink jet systems are not particularly limited and may be known ink jet systems, such as of continuous ejection types (such as a charge control type and a spray type) and on-demand types (such as a piezoelectric system, a thermal system, and an electrostatic attraction system).

EXAMPLES

The present invention will be described in detail below in the following examples.

Unless otherwise specified, "parts" refers to "parts by mass", and "%" refers to "% by mass".

The following resins were used in the examples and comparative examples.

Resin A: A resin powder of a styrene-acrylic acid copolymer having a monomer component ratio of styrene/acrylic acid/methacrylic acid/butyl acrylate=76.92/9.99/12.99/0.1 (mass ratio), an acid value of 153 mgKOH/g, and a weight-average molecular weight of 12,000.

Resin B: A resin of a styrene-acrylic acid copolymer having a monomer component ratio of styrene/acrylic acid/methacrylic acid/butyl acrylate=74/11.3/14.6/0.1 (mass ratio), an acid value of 172 mgKOH/g, and a weight-average molecular weight of 11,000.

Resin C: A resin of a styrene-acrylic acid copolymer having a monomer component of styrene/acrylic acid/methacrylic acid/butyl acrylate=83/7.35/9.55/0.1 (mass ratio), an acid value of 120 mgKOH/g, and a weight-average molecular weight of 9,000. The weight-average molecular weights are polystyrene equivalent molecular weights measured by gel permeation chromatography (GPC).

An aqueous pigment dispersion liquid having a pigment concentration of 13.5% by mass was prepared. The pigment dispersion state was evaluated in terms of the concentration of coarse particles having a particle size of 0.5 μm or more. The storage stability of the aqueous pigment dispersion liquid was evaluated in terms of the rate of increase in particle size. Various additive agents were added to a water-color pigment dispersion liquid to prepare an ink jet recording ink. The ink ejection characteristics were evaluated after left standing.

Example 1

(Kneading Step)

A planetary mixer (trade name: Chemical mixer ACM04LVTJ-B manufactured by Aicohsha Manufacturing Co., Ltd.) was charged with 12 parts of the resin A, 39 parts of "Cromophtal Jet Magenta DMQ (manufactured by BASF SE)" as the quinacridone pigment (a), and 1 part of "phthalimidemethylated 3,10-dichloroquinacridone (the average number of phthalimidemethyl groups per molecule: 1.4)" as the pigment derivative (b). The jacket was heated. After the temperature of the contents reached 80° C., the contents were kneaded at a rotational speed of 80 revolutions per minute and an orbital speed of 25 revolutions per minute.

After 5 minutes, 5.4 parts of an inorganic basic compound KOH (34% by mass aqueous potassium hydroxide) as the basic compound (d), 20 parts of diethylene glycol as the water-soluble organic solvent (f), and 0.4 parts of Surfynol 420 (a 20% by mass ethylene oxide adduct of 2,4,7,9-tetramethyl-5-decyne-4,7-diol, HLB=4, manufactured by Air Products) as the acetylene glycol surfactant (e) were added.

Kneading was continued to a point in time 40 minutes after the current value of the planetary mixer reached its maximum, thus producing a pigment-kneaded material. The pigment-kneaded material is a stiff kneaded material that flows negligibly at normal temperature and pressure.

(Dilution Step)

After the kneading step, the pigment-kneaded material was removed from the jacket, was cut into a 1 cm×1 cm square, and was charged into a commercial juicer mixer. The product was mixed and diluted with 90 parts of ion-exchanged water in the mixer for 10 minutes. Another ion-exchanged water was added to the product, yielding an aqueous pigment dispersion liquid A having a quinacridone pigment concentration of 13.5% by mass.

Example 2

An aqueous pigment dispersion liquid B according to Example 2 was produced in the same manner as in Example 1 except that the amount of Surfynol 420 was changed from 0.4 parts to 0.8 parts.

Example 3

An aqueous pigment dispersion liquid C according to Example 3 was produced in the same manner as in Example 1 except that the amount of Surfynol 420 was changed from 0.4 parts to 1.6 parts.

Example 4

An aqueous pigment dispersion liquid D according to Example 4 was produced in the same manner as in Example 1 except that the surfactant was Surfynol 440 (a 40% by mass ethylene oxide adduct of 2,4,7,9-tetramethyl-5-decyne-4,7-diol, HLB=8, manufactured by Air Products).

Example 5

An aqueous pigment dispersion liquid E according to Example 5 was produced in the same manner as in Example 1 except that the surfactant was Surfynol 465 (a 65% by mass ethylene oxide adduct of 2,4,7,9-tetramethyl-5-decyne-4,7-diol, HLB=13, manufactured by Air Products).

Example 6

An aqueous pigment dispersion liquid F according to Example 6 was produced in the same manner as in Example 5 except that the amount of Surfynol 465 was changed from 0.4 parts to 0.8 parts.

Example 7

An aqueous pigment dispersion liquid G according to Example 7 was produced in the same manner as in Example 5 except that the amount of Surfynol 465 was changed from 0.4 parts to 1.6 parts.

Example 8

An aqueous pigment dispersion liquid H according to Example 8 was produced in the same manner as in Example 1 except that the surfactant was Surfynol 485 (a 85% by mass ethylene oxide adduct of 2,4,7,9-tetramethyl-5-decyne-4,7-diol, HLB=17, manufactured by Air Products).

Example 9

An aqueous pigment dispersion liquid I according to Example 9 was produced in the same manner as in Example 8 except that the amount of Surfynol 485 was changed from 0.4 parts to 0.8 parts.

Example 10

An aqueous pigment dispersion liquid J according to Example 10 was produced in the same manner as in Example 8 except that the amount of Surfynol 485 was changed from 0.4 parts to 1.6 parts.

Example 11

An aqueous pigment dispersion liquid K according to Example 11 was produced in the same manner as in Example 8 except that the amount of Surfynol 485 was changed from 0.4 parts to 4.0 parts.

Example 12

An aqueous pigment dispersion liquid L according to Example 12 was produced in the same manner as in Example 1 except that the surfactant was Surfynol 2502 (an ethylene oxide (5 mol) and propylene oxide (2 mol) adduct of 2,4,7,9-tetramethyl-5-decyne-4,7-diol, HLB=8, manufactured by Air Products).

Example 13

An aqueous pigment dispersion liquid M according to Example 13 was produced in the same manner as in Example 9 except that the pigment was Cromophtal Jet Magenta 2BC (manufactured by BASF SE).

Example 14

An aqueous pigment dispersion liquid N according to Example 2 was produced in the same manner as in Example 2 except that the surfactant was Surfynol 104 (2,4,7,9-tetramethyl-5-decyne-4,7-diol, HLB=4, manufactured by Air Products).

Example 15

An aqueous pigment dispersion liquid O according to Example 15 was produced in the same manner as in Example 4 except that the resin A was replaced with 12 parts of the resin B, the amount of the pigment was 38 parts, the amount of the pigment derivative was 2 parts, and the amount of 34% by mass aqueous potassium hydroxide was 6.07 parts.

Example 16

An aqueous pigment dispersion liquid P according to Example 16 was produced in the same manner as in Example 4 except that the resin A was replaced with 12 parts of the resin C, and the amount of 34% by mass aqueous potassium hydroxide was 4.24 parts.

Comparative Example 1

An aqueous pigment dispersion liquid R according to Comparative Example 1 was produced in the same manner as in Example 1 except that no surfactant was added.

Comparative Example 2

An aqueous pigment dispersion liquid S according to Comparative Example 2 was produced in the same manner as in Example 5 except that the surfactant was added in the dilution step instead of the dispersing step by kneading.

Comparative Example 3

An aqueous pigment dispersion liquid T according to Comparative Example 3 was produced in the same manner as in Example 5 except that phthalimidemethylated 3,10-dichloroquinacridone was not added.
(Evaluation of Aqueous Pigment Dispersion Liquid)
[Volume-Average Particle Size]

The particle size of the aqueous pigment dispersion liquids according to the examples and comparative examples was measured with a Microtrac UPA150EX particle size analyzer (manufactured by Nikkiso Co., Ltd.) at a cell temperature of 25° C. A sample for particle size measurement was prepared by diluting each of the aqueous pigment dispersion liquids with ion-exchanged water to a quinacridone pigment concentration of 12.5% by mass and then 500-fold with ion-exchanged water.
[Number of Coarse Particles]

The number of coarse particles was measured with Accu-Sizer 780 (Particle Sizing Systems, Inc.). A sample for measurement of the number of coarse particles was prepared by decreasing the quinacridone pigment concentration with 200- to 10000-fold ion-exchanged water such that the number of counts of coarse particles having a particle size of 0.5 µm or more ranged from 1000 to 4000 when the sample passed through a detector at 1 ml/s.

The number of coarse particles was converted into the number of coarse particles contained in 1 ml of the aqueous pigment dispersion liquid having a quinacridone pigment concentration of 12.5% by mass with the dilution ratio taken into account.

The numbers of coarse particles in the aqueous pigment dispersion liquids according to the examples and comparative examples were compared according to the following criteria.

For comparison between the aqueous pigment dispersion liquids A to M and R to T,
the amount of coarse particles in each aqueous pigment dispersion liquid was rated as follows, wherein STD-1 denotes the amount of coarse particles in the aqueous pigment dispersion liquid R:
  30% or less by mass of STD-1: A,
  31% to 60% by mass of STD-1: B,
  61% to 80% by mass of STD-1: C, and
  the others: D.
[Storage Stability]

Storage stability of aqueous pigment dispersion liquids according to the examples, comparative examples, and reference examples was evaluated at 60° C. Storage stability was rated on the basis of the difference between the initial particle size measured before the start of the test and the particle size measured six weeks after the start of the test:
  a difference of 30% or less by mass: A, and
  the others: B.
[Preparation of Water-Based Ink for Ink Jet Recording]

The aqueous pigment dispersion liquids according to the examples and comparative examples were diluted with pure water to prepare diluted aqueous pigment dispersion liquids having a quinacridone pigment concentration of 6% by mass. The diluted liquids were formulated as described below to prepare water-based inks for ink jet recording.
  Diluted aqueous pigment dispersion liquid: 50 parts
  2-pyrrolidinone: 8 parts
  Triethylene glycol mono-n-butyl ether: 8 parts
  Refined glycerin: 3 parts
  Surfynol 440 (manufactured by Air Products): 0.5 parts
  Pure water: 30.5 parts The water-based inks for ink jet recording thus prepared were tested with an ink jet printer (Photosmart D5360 manufactured by Hewlett-Packard Co.). A black cartridge filled with the ink was mounted in the printer and was stored for one month. A nozzle check test pattern was then printed to compare the state of the nozzle.

In this nozzle check test, if the nozzle check test pattern has no missing part, there is no problem. If the nozzle check test pattern has a missing part, there is an ejection failure. In this case, the nozzle is cleaned (a function provided with the printer) to recover from the failure. Cleaning can be performed at different levels. Weak cleaning finishes in a short time and consumes a small amount of ink. Strong cleaning takes a long time and consumes a large amount of ink. For excessively poor nozzle states, even strong cleaning may not recover the normal state.

The ejection performance of the water-based inks for ink jet recording was compared according to the following criteria.

A cartridge filled with an ink was stored for one month. A nozzle check test pattern was then printed to check for normal ejection.
  No cleaning was required for normal ejection: A
  Weak cleaning was required for normal ejection: B
  Strong cleaning was required for normal ejection: C
  Cleaning did not recover normal ejection: D Tables 1 and 2 list the results for the examples and comparative examples. Table 3 lists the trade name and components of the acetylene glycol surfactant (e).

TABLE 1

| | Pigment dispersion liquid | Pigment (a) | Surfactant (e) | Mass ratio of surfactant (e)*1 | Percentage of pigment derivative (b) in pigment (a) + (b)*2 | Step of adding surfactant (e) |
|---|---|---|---|---|---|---|
| Example 1 | A | DMQ*3 | E1 | 0.01 | 0.025 | Kneading step |
| Example 2 | B | DMQ | E1 | 0.02 | 0.025 | Kneading step |
| Example 3 | C | DMQ | E1 | 0.04 | 0.025 | Kneading step |
| Example 4 | D | DMQ | E2 | 0.01 | 0.025 | Kneading step |
| Example 5 | E | DMQ | E3 | 0.01 | 0.025 | Kneading step |
| Example 6 | F | DMQ | E3 | 0.02 | 0.025 | Kneading step |
| Example 7 | G | DMQ | E3 | 0.04 | 0.025 | Kneading step |
| Example 8 | H | DMQ | E4 | 0.01 | 0.025 | Kneading step |
| Example 9 | I | DMQ | E4 | 0.02 | 0.025 | Kneading step |
| Example 10 | J | DMQ | E4 | 0.04 | 0.025 | Kneading step |

TABLE 1-continued

| | Pigment dispersion liquid | Pigment (a) | Surfactant (e) | Mass ratio of surfactant (e)*1 | Percentage of pigment derivative (b) in pigment (a) + (b)*2 | Step of adding surfactant (e) |
|---|---|---|---|---|---|---|
| Example 11 | K | DMQ | E4 | 0.10 | 0.025 | Kneading step |
| Example 12 | L | DMQ | E5 | 0.01 | 0.025 | Kneading step |
| Example 13 | M | 2BC*4 | E4 | 0.02 | 0.025 | Kneading step |
| Example 14 | N | DMQ | E6 | 0.02 | 0.025 | Kneading step |
| Example 15 | O | DMQ | E2 | 0.01 | 0.05 | Kneading step |
| Example 16 | P | DMQ | E2 | 0.01 | 0.025 | Kneading step |
| Comparative example 1 | R | DMQ | None | 0 | 0.025 | Kneading step |
| Comparative example 2 | S | DMQ | E3 | 0.01 | 0.025 | Dilution step |
| Comparative example 3 | T | DMQ | E3 | 0.01 | 0 | Kneading step |

In the table,
*1Surfactant (e)/(pigment derivative (b) + pigment (a)) (mass ratio)
*2Pigment derivative (b)/(pigment derivative (b) + pigment (a)) (mass ratio)
*3DMQ; Cromophtal Jet Magenta DMQ (manufactured by BASF SE)
*42BC; Cromophtal Jet Magenta 2BC (manufactured by BASF SE)

TABLE 2

| | Pigment dispersion liquid | Number of coarse particles 0.5 μm or more in size (×10$^9$)*5 | Storage stability*6 | Ink ejection reliability*7 |
|---|---|---|---|---|
| Example 1 | A | B | A | B |
| Example 2 | B | B | A | B |
| Example 3 | C | A | A | A |
| Example 4 | D | B | A | B |
| Example 5 | E | B | A | B |
| Example 6 | F | A | A | A |
| Example 7 | G | A | A | A |
| Example 8 | H | B | A | B |
| Example 9 | I | B | A | B |
| Example 10 | J | A | A | A |
| Example 11 | K | A | A | A |
| Example 12 | L | B | A | B |
| Example 13 | M | A | A | A |
| Example 14 | N | A | A | A |
| Example 15 | O | A | A | A |
| Example 16 | P | B | A | B |
| Comparative example 1 | R | STD-1 | A | D |
| Comparative example 2 | S | D | A | D |
| Comparative example 3 | T | A | B | C |

*5Amount of coarse particles:
A; The amount or coarse particles is 30% or less by mass of STD-1.
B; The amount of coarse particles ranges from 31% to 60% by mass of STD-1.
C; The amount of coarse particles ranges from 61% to 80% by mass of STD-1.
D; The others.
*6Storage stability test:
The rate of increase in average particle size due to the heating test was
A; 30% or less by mass, and
B; the others.
*7A black cartridge filled with the ink was mounted in the printer and was stored for one month. In the evaluation of ink ejection,
A; No cleaning was required,
B; Weak cleaning was required for normal ejection,
C; Strong cleaning was required for normal ejection, and
D; Cleaning did not recover normal ejection.

TABLE 3

| Trade name of surfactant (e) | Components |
|---|---|
| E1 Surfynol 420 | Ethylene oxide (20 mass %) adduct of Surfynol 104 |
| E2 Surfynol 440 | Ethylene oxide (40 mass %) adduct of Surfynol 104 |
| E3 Surfynol 465 | Ethylene oxide (65 mass %) adduct of Surfynol 104 |
| E4 Surfynol 485 | Ethylene oxide (85 mass %) adduct of Surfynol 104 |
| E5 Surfynol 2502 | Surfynol 104 + 5 mol ethylene oxide adduct + 2 mol propylene oxide adduct |
| E6 Surfynol 104 | 2,4,7,9-tetramethyl-5-decyne-4,7-diol |

In Comparative Example 1, the acetylene glycol surfactant (e) was not used in the kneading step. The amount of coarse particles contained in an ink prepared from this aqueous pigment dispersion liquid was taken as the standard (STD-1). The increase or decrease in the number of coarse particles was determined relative to the standard. In an ink cartridge filled with the water-based ink for ink jet recording according to Comparative Example 1, coarse particles may sediment and be deposited in the vicinity of the nozzle after many hours and may cause an ejection failure.

In Examples 1 to 13, the acetylene glycol surfactant (e) was added in the kneading step. In all these examples, the number of coarse particles in the aqueous pigment dispersion liquid was smaller than that of the standard according to Comparative Example 1. The water-based inks for ink jet recording according to these examples in an ink cartridge had satisfactory ejection performance even after many hours. In the presence of the acetylene glycol surfactant (e), all the results were satisfactory irrespective of the presence of the ethylene oxide group or the presence and absence of the propylene oxide group.

This is probably because the acetylene glycol surfactant (e) permeates into aggregates contained in the pigment, reduces the surface energy of the pigment, and promotes deflocculation due to mechanical energy. As a result of a decrease in the number of coarse particles in the aqueous pigment dispersion liquid, a decreased number of coarse particles are deposited in the vicinity of the nozzle of the ink cartridge.

In the present invention, the effects of the addition of the acetylene glycol surfactant (e) during kneading (dispersion) are apparent from the comparison of Example 5 with Comparative Example 2. In Example 5, in which the acetylene glycol surfactant (e) was used in the pigment kneading step, the number of coarse particles decreased. In Comparative Example 2, in which the acetylene glycol surfactant (e) was added in the dilution step, the number of coarse particles did not decrease. In the presence of both a pigment and adequate water, the acetylene glycol surfactant (e) has a higher affinity for water than for the pigment, is therefore stable in water, has a very weak interaction with the pigment, and has a greatly reduced wetting effects. Thus, it is assumed that the surfactant can act on the pigment at a very high solid content in the kneading and dispersion step, but cannot act on the pigment in the presence of a large amount of water in the dilution step.

In Comparative Example 3, the pigment derivative (b) was not used in the kneading step. In this case, although the acetylene glycol surfactant (e) had the effect of decreasing the number of coarse particles, the storage stability was poor. This is probably because reaggregation of the dispersed pigment could not be prevented in the absence of the pigment derivative (b). Thus, the ink had poor ejection performance after the long-term storage.

The invention claimed is:

1. A method for producing an aqueous pigment dispersion liquid, comprising: a kneading step of kneading a mixture of a quinacridone pigment (a), a pigment derivative (b), an organic high-molecular compound having an anionic group (c), a basic compound (d), and an acetylene glycol surfactant (e) in a closed kneader to prepare a pigment-kneaded material having a solid content in the range of 50% to 80% by mass; and a step of diluting the pigment-kneaded material with an aqueous medium, wherein the aqueous pigment dispersion liquid prepared by the method includes coarse particles having a particle size of 0.5 μm or more at 60% by mass or less of a standard aqueous pigment dispersion liquid, wherein the standard aqueous pigment dispersion liquid is prepared as a comparative method that is same as the method except for excluding the acetylene glycol surfactant (e) in the kneading step.

2. The method for producing an aqueous pigment dispersion liquid according to claim 1, wherein the pigment derivative (b) is a quinacridone pigment derivative.

3. The method for producing an aqueous pigment dispersion liquid according to claim 1, wherein the acetylene glycol surfactant (e) in the kneading step of preparing the pigment-kneaded material constitutes 20% or less by mass of the total amount of the quinacridone pigment (a) and the pigment derivative (b).

4. The method for producing an aqueous pigment dispersion liquid according to claim 1, wherein the organic high-molecular compound having an anionic group I is a styrene-acrylic acid copolymer.

5. A method for producing a water-based ink for ink jet recording, comprising a step of diluting an aqueous pigment dispersion liquid with an aqueous medium, the aqueous pigment dispersion liquid being produced by the method for producing an aqueous pigment dispersion liquid according to claim 1.

6. The method for producing an aqueous pigment dispersion liquid according to claim 1, wherein the pigment-kneaded material has the solid content in the range of 60% to 80% by mass.

* * * * *